Jan. 2, 1923.

F. M. BINS.
COUPLING FOR CANVAS TUBING.
FILED MAR. 5, 1921.

Frank M. Bins INVENTOR.
By Alexander & Powell Attorneys

Jan. 2, 1923.                          1,440,814.
F. M. BINS.
COUPLING FOR CANVAS TUBING.
FILED MAR. 5, 1921.
2 SHEETS—SHEET 2.
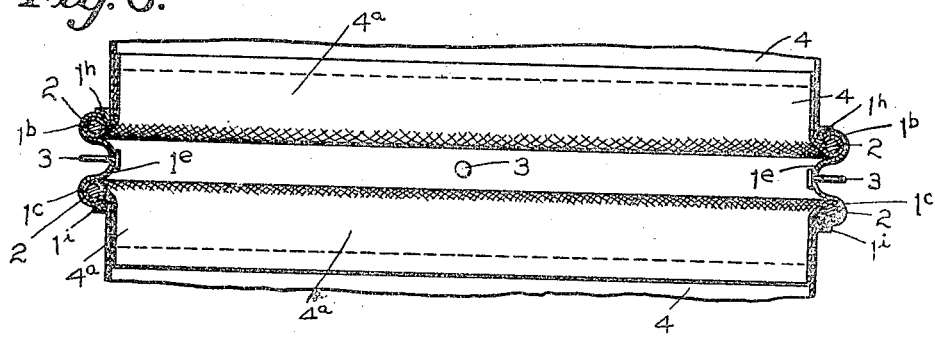
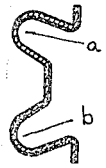 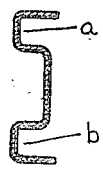
 
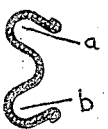 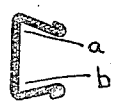
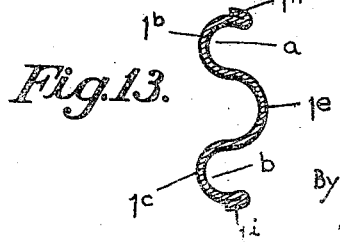

Patented Jan. 2, 1923.

1,440,814

UNITED STATES PATENT OFFICE.

FRANK M. BINS, OF BUTTE, MONTANA.

COUPLING FOR CANVAS TUBING.

Application filed March 5, 1921. Serial No. 449,922.

*To all whom it may concern:*

Be it known that I, FRANK M. BINS, a citizen of the United States, residing at Butte, in the county of Silverbow and State of Montana, have invented certain new and useful Improvements in Couplings for Canvas Tubing; and I hereby declare that the following is a full, clear, and exact description thereof, reference being had to the accompanying drawings, which form part of this specification.

This invention relates to means for coupling sections of flexible or collapsible pipe or tubing, commonly made of fabric such as canvas.

The object of the invention is to provide a simple and effective means for readily coupling sections or lengths of such flexible tubing together whereby the lengths or sections of such flexible tubing may be readily coupled together and by which the tubing can be readily suspended or fastened in operative position. Such flexible tubing is commonly used for conducting air or gases from one point to another or for other purposes in the art; such tubing being principally used for ventilating mines, the air being forced therethrough.

A further object of the invention is to make a coupling which will be inexpensive and durable; and by which the sections of tubing can be easily connected together or disconnected as desired; and which has no parts that are liable to rust or corrode and thereby prevent or interfere with the ready removal of worn or damaged sections of the tubing, or reuse of the coupling.

I will explain the invention with reference to the accompanying drawings which illustrate the at present preferred embodiment of the invention, and various simple modifications thereof; and refer to the claims for summaries of the essentials of the invention, and novel features of construction and novel combinations of parts for which protection is desired.

In said drawings;

Fig. 6 is a transverse sectional view through one of the complete couplings and ends of two tubes connected thereby.

Figs. 7 to 12 inclusive are detail views, each illustrating a cross section of a slight modification of the contour of the coupling annulus.

Figure 2:
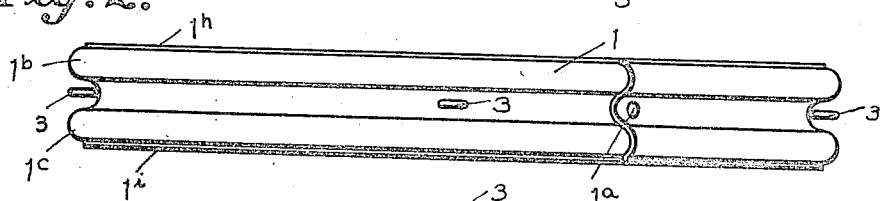
Fig. 2 is an enlarged side view of the annulus or body of the at present preferred form of coupling detached.
Figure 3:
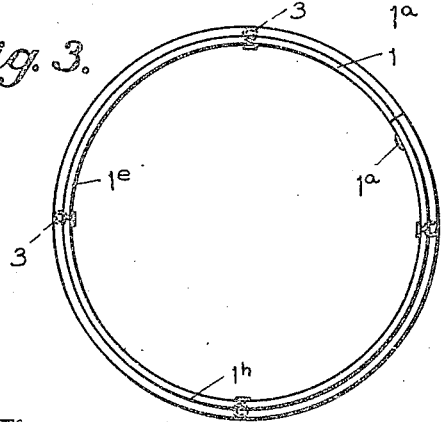
Fig. 3 is a reduced plan view of Fig. 2.

Fig. 13 is an enlarged cross section of the annulus shown in Fig. 2.

The coupling comprises an annulus or body provided with interior parallel annular grooves or recesses near its opposite edges; and two spring rings each adapted to be engaged with the end of a section of flexible tubing and then inserted in one of the said grooves or recesses as hereinafter described; and thus unite or couple the two sections of tubing whether same are to be used in a vertical, horizontal or inclined position.

The annulus or body is preferably provided with exterior means, such as eyelets for engagement of suitable suspending devices by which the coupling and tubing can be fastened and supported in the desired position.

The annulus 1 may be made of any suitable material, but is preferably made of sheet metal rolled into desired cross section and its ends overlapped and united by any suitable means, as solder or rivets, as indicated at $1^a$. The annulus should be made of an interior diameter approximately the same as, or preferably slightly less than, the exterior diameter of the sections of flexible tubing to be connected therewith.

The annulus as shown in Figs. 1, 2, 3, 6, and 13 is preferably provided with a central concavo-convex portion $1^c$ and with reversely bent portions $1^b$ and $1^c$ at the upper and lower edges of part $1^a$. The portions $1^b$, $1^c$ form internal annular grooves or recesses $a$, $b$, within the body, which are adapted to receive the spring rings hereinafter referred to. Preferably the outer edges of the metal strip of which the annulus is formed, are bent outwardly and backwardly upon themselves as indicated at 1ʰ and 1ⁱ, so that the outer edges of the grooves 1ᵇ, 1ᶜ will not cut the flexible fabric tubing when the latter is engaged therewith.

Figure 1:
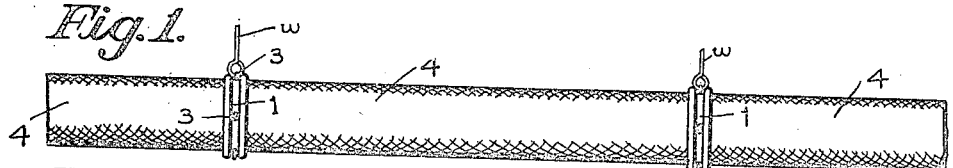
Fig. 1 is a side view of a length of ventilating pipe formed of a plurality of sections of flexible fabric tubing united by my novel couplings.

The annulus is preferably provided with a suitable number of devices such as eyelets 3, as indicated in the drawing, by which the annulus and attached tubing can be readily connected to any suitable suspending or supporting devices, such as wires w, Fig. 1.

The tubing sections 4 may be of any suitable flexible material, canvas or like fabric being most commonly employed, and each end of each tube section is formed with a hem 4ᵃ, and in this hem is inserted an expansion ring 2 which is preferably formed of resilient or spring wire and when expanded in the hem is of slightly larger diameter than the interior of the grooves in parts 1ᶜ, 1ᵇ.

Figure 4:
Fig. 4 is an edge view of one of the expanding rings used in connection with the annulus showing the same as it is confined within a hem of the tubing.
Figure 5:
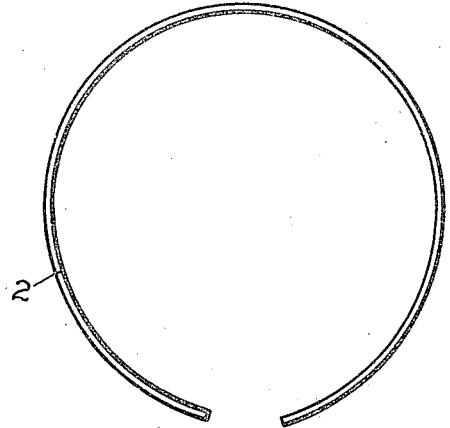
Fig. 5 is a reduced plan view of one of the expanding rings in open position or detached from the tubing.

When the ring 2 is inserted in the hem the ends of the wire forming the ring 2 overlap, as indicated in Fig. 4, so that when such ring is inserted in the hem of a section of tubing there will be no void or space between the ends of the wire; and these overlapped ends assist in facilitating the contraction of the end of the tubing and the ring when and while the latter is being inserted into the groove a or b of the annulus.

A ring 2 is inserted in the hem on each end of each tube section to be connected. Then all that is required to effect a coupling is to slightly contract the said hemmed end and ring, the overlapping ends of the ring sliding upon each other until said ring and hem can enter one of the annular grooves (a or b) in the annulus 1. Then upon releasing the ring the latter expands and automatically binds the hem in such groove (see Fig. 6) the ring imbedding itself and part of the surrounding hem in such groove; when properly engaged—as in Fig. 6, direct pull or strain longitudinally of the tubing will not displace the rings, and the tubing sections are firmly and securely attached to the annulus.

To disconnect or uncouple a tubing section all that is required is to compress the spring ring and hem until the ring and tube end can be drawn out of the groove in the annulus.

Figs. 7 to 12 show cross sectional contours of various forms of the annulus each of which could be readily formed out of sheet metal. Each of these forms provides grooves a and b for the reception of the retaining rings. The tubing sections with the spring rings 2 could be readily engaged as above explained with any one of the forms of annulus shown in Figs. 7 to 12 and be retained therein and connect the sections substantially as above described. These various modifications are simply illustrative of the capacity of the invention for variation, and not as limiting it. The invention in its broader aspects is not restricted to any specific form of the annulus.

This invention does not require the canvas of the tubing to be sewed around the ring. All that is required is that a hem be made in the ends of the hose or tubing to receive the ring, and the spring ring is inserted into this hem. The solid corrugated or grooved annulus and the rings can be used repeatedly until physically destroyed; and the annulus is not covered or directly fastened to the canvas, thus leaving the suspending devices thereon always readily accessible, by which to hang or suspend said tubing.

In this invention, the solid annulus is not covered with canvas and is accessible at all times and is provided with a suitable number of eyelets, or other fastenings by which it can be attached to suitable supports. When tubing connected by such couplings is to be hung up horizontally in a drift or tunnel, or is to be suspended in a vertical or inclined shaft, the eyelets or other fastenings on the annulus provide a convenient suitable means to connect the tubing to suspending devices and support the weight of the tubing and the strains to which said tubing may be subjected, and such weight and strain is not all put upon the canvas tubing itself. The coupling also enables the tubing to be easily turned around to any desired position, after as well as before the coupling is made.

This coupling does not have any slots or movable parts liable to corrode from the dampness, which is usually present in mines and which corrosion has proved a great disadvantage and objection to many of the couplings heretofore used.

I claim:

1. A coupling for flexible tubing and the like; comprising an annulus having interior circumferential grooves for the reception of spring members, and two spring members, respectively connected to the ends of the tubing sections to be coupled together, engaged with the grooves in the annulus, substantially as described.

2. A coupling for the purpose described; comprising an annulus having parallel interior circumferential grooves, the interior diameter of the annulus being approximately the same as the exterior diameter of the tube sections to be connected thereto; with spring rings each adapted to be connected to a tube section and then sprung into a groove of the annulus, substantially as described.

3. A coupling, comprising an annular member provided with interior circumferential parallel grooves for the reception of spring members; expansive spring members of normally larger diameter than the internal diameter of the annulus, each spring member being adapted to be engaged with the end of a tube section and then engaged with a groove in the annulus, substantially as described.

4. A coupling for the purpose described, comprising an annulus formed of metal and having parallel interior circumferential grooves, and of an interior diameter approximately the same as the exterior diameter of the tube sections to be connected thereto with split spring rings each adapted to be connected to a flexible pipe section and then contracted and sprung into the grooves of the annulus.

5. A coupling, comprising an annular member formed of sheet metal and provided with interior circumferential parallel grooves; expansive spring rings having overlapping ends and of normally larger diameter than the internal diameter of the annulus; each ring being adapted to be engaged with the hem in the end of a flexible tube section; the spring rings in the ends of adjacent tube sections being respectively engaged with the grooves in the annulus, substantially as described.

6. A coupling for flexible tubing and the like comprising an annulus having interior circumferential grooves for the reception of spring members, substantially as described.

7. In a coupling, an annular member formed of sheet metal and provided with interior circumferential parallel grooves for the reception of expansive spring rings and of approximately the same internal diameter as the tubing sections to be connected thereto, said annulus having its edges turned outwardly at the edge of the groove so as not to cut the canvas.

8. A coupling for flexible tubing and the like comprising a solid annulus of suitable material provided with fastening devices for attaching it to a suitable support, and expansible ring members adapted to be engaged with the sections and connect the same to the annulus.

In testimony that I claim the foregoing as my own, I affix my signature.

FRANK M. BINS.